(12) United States Patent
D'Eqidio (10) Patent No.: US 7,508,929 B2
(45) Date of Patent: Mar. 24, 2009

(54) APPARATUS AND METHOD OF SIMULATING TELEPHONE "IN USE" SIGNALS IN A LINE IN A TELEPHONE RING SYSTEM

(76) Inventor: Anthony George D'Eqidio, 8652 Via Reale, #3, Boca Raton, FL (US) 33496

( * ) Notice: Subject to any disclaimer, the term of this patent is extended or adjusted under 35 U.S.C. 154(b) by 527 days.

(21) Appl. No.: 11/152,441

(22) Filed: Jun. 14, 2005

(65) Prior Publication Data

US 2006/0088150 A1    Apr. 27, 2006

Related U.S. Application Data (60) Provisional application No. 60/621,907, filed on Oct. 25, 2004.

(51) Int. Cl.
  *H04M 1/00* (2006.01)
  *H04M 9/00* (2006.01)
(52) U.S. Cl. ....................................................... 379/393
(58) Field of Classification Search ................. 379/393, 379/162, 163
  See application file for complete search history.

(56) References Cited

U.S. PATENT DOCUMENTS

| | | | |
|---|---|---|---|
| 3,321,631 A | 5/1967 | Biard et al. | |
| 3,858,008 A * | 12/1974 | Remec ........................ | 379/381 |
| 3,867,584 A | 2/1975 | Rengren | |
| 3,867,588 A | 2/1975 | Pickens et al. | |
| 3,870,831 A | 3/1975 | McCarley | |
| 3,922,563 A | 11/1975 | Penman | |
| 3,934,089 A | 1/1976 | Stewart | |
| 3,952,169 A | 4/1976 | Vincent | |
| 4,011,413 A | 3/1977 | Phillips | |
| 4,031,332 A | 6/1977 | Shylo | |
| 4,156,799 A | 5/1979 | Cave | |
| 4,227,098 A | 10/1980 | Brown et al. | |
| 4,307,460 A | 12/1981 | Polonsky | |
| 4,315,332 A | 2/1982 | Sakami et al. | |
| 4,321,429 A | 3/1982 | Takatsuki et al. | |
| 4,323,735 A | 4/1982 | Balzer et al. | |
| 4,323,799 A | 4/1982 | King et al. | |
| 4,392,023 A | 7/1983 | Sears | |
| 4,405,839 A | 9/1983 | Groff | |
| 4,480,154 A * | 10/1984 | Klee ....................... | 379/376.02 |
| 4,578,540 A | 3/1986 | Borg et al. | |
| 4,737,981 A * | 4/1988 | Hoberman et al. .......... | 379/111 |
| 4,893,329 A | 1/1990 | O'Brien | |
| 4,924,499 A | 5/1990 | Serby | |
| 5,060,255 A | 10/1991 | Brown | |
| 5,131,030 A | 7/1992 | Cameron | |
| 5,157,712 A | 10/1992 | Wallen, Jr. | |
| 5,317,632 A | 5/1994 | Ellison | |
| 5,333,190 A | 7/1994 | Eyster | |
| 5,365,494 A | 11/1994 | Lynch | |
| 5,467,388 A | 11/1995 | Redd, Jr. et al. | |
| 5,487,053 A | 1/1996 | Beiswenger et al. | |
| 5,604,791 A | 2/1997 | Lee | |
| 5,612,997 A | 3/1997 | Vallelonga, Sr. et al. | |
| 5,696,810 A | 12/1997 | Dunn | |

(Continued)

*Primary Examiner*—Alexander Jamal
(74) *Attorney, Agent, or Firm*—Frank J. Benasutti (57) ABSTRACT

An apparatus and method is disclosed for simulating an "in use" condition in a telephone line, so that incoming calls will get a busy signal and, therefore, will not ring all telephones on that line.

11 Claims, 7 Drawing Sheets

U.S. PATENT DOCUMENTS

| | | |
|---|---|---|
| 5,764,752 A | 6/1998 | Waite et al. |
| 5,784,458 A | 7/1998 | Adachi et al. |
| 5,812,648 A | 9/1998 | Wanner |
| 5,835,587 A | 11/1998 | Adachi et al. |
| 5,896,567 A | 4/1999 | Ogushi |
| 5,907,613 A | 5/1999 | Korn |
| 6,757,381 B1 | 6/2004 | Worley |
| 2002/0176568 A1 | 11/2002 | Levitan |
| 2004/0174970 A1 | 9/2004 | Rutter |

* cited by examiner

APPARATUS AND METHOD OF SIMULATING TELEPHONE "IN USE" SIGNALS IN A LINE IN A TELEPHONE RING SYSTEM

CROSS REFERENCE TO RELATED APPLICATION

This application is a continuation-in-part of my prior co-pending provisional patent application No. 60/621,907 filed Oct. 25, 2004 entitled "Digital controller for telephone lines" which is incorporated herein by reference as if fully set forth.

BACKGROUND OF THE INVENTION

1. Technical Field

The present invention relates to control of incoming telephone calls, and more particularly, to simulating "in use" signals to prevent incoming calls from ringing telephones connected to the same line.

2. Background

It may be desirable to prevent incoming telephone calls, from time to time, from ringing the telephone. Simply disconnecting the telephone does not provide an adequate solution for this purpose.

The prior art provides a variety of mechanical solutions as well as complex electrical systems.

See for example, U.S. Pat. No. 3,867,584 which discloses a do-not-disturb adapter (including a rotating cam) for telephone receivers. Pending U.S. patent application Ser. No. 10/379,301, Publication number US 2004/0174970 A1 discloses another mechanical telephone line isolation device. U.S. Pat. No. 4,405,839 discloses a timed telephone ring silencer device.

I have invented an inexpensive electrical apparatus and method for simulating an "in use" signal to prevent incoming calls from ringing telephones connected to the same line. I provide a timing controller means for setting and resetting time intervals; which is repeatable, which provides for "do-not-disturb" and which can be easily switched on and off.

SUMMARY OF INVENTION

In a telephone system having a circuit which provides a busy signal in a telephone line when the telephone is in an "in use" mode, I have invented a simulation means to simulate an "in use" mode, comprising:
  a. switch means switchable between an open circuit position and a closed circuit position;
  b. relay means connected to said switch means to switch said switch means between said positions;
  c. controller means connected to said relay means to cause said relay means to switch said switch means as aforesaid; and
  d. time set means connected to said controller means to set time intervals that the controller means causes the relay means to switch said switch means as aforesaid.

I also invented a method of simulating an "in use" mode in a telephone system having a circuit which provides a busy signal in a telephone line when the telephone is in an "in use" mode, comprising providing a switch means in said circuit, switchable between an open circuit position and a closed circuit position; providing a relay means connected to said switch means to switch said switch means between said positions; providing a controller means connected to said relay means to cause said relay means to switch said switch means as aforesaid; and providing time set means connected to said controller means to set time intervals that the controller means causes the relay means to switch said switch means as aforesaid.

DETAILED DESCRIPTION OF THE PREFERRED EMBODIMENT OF THE INVENTION

Figure 1:
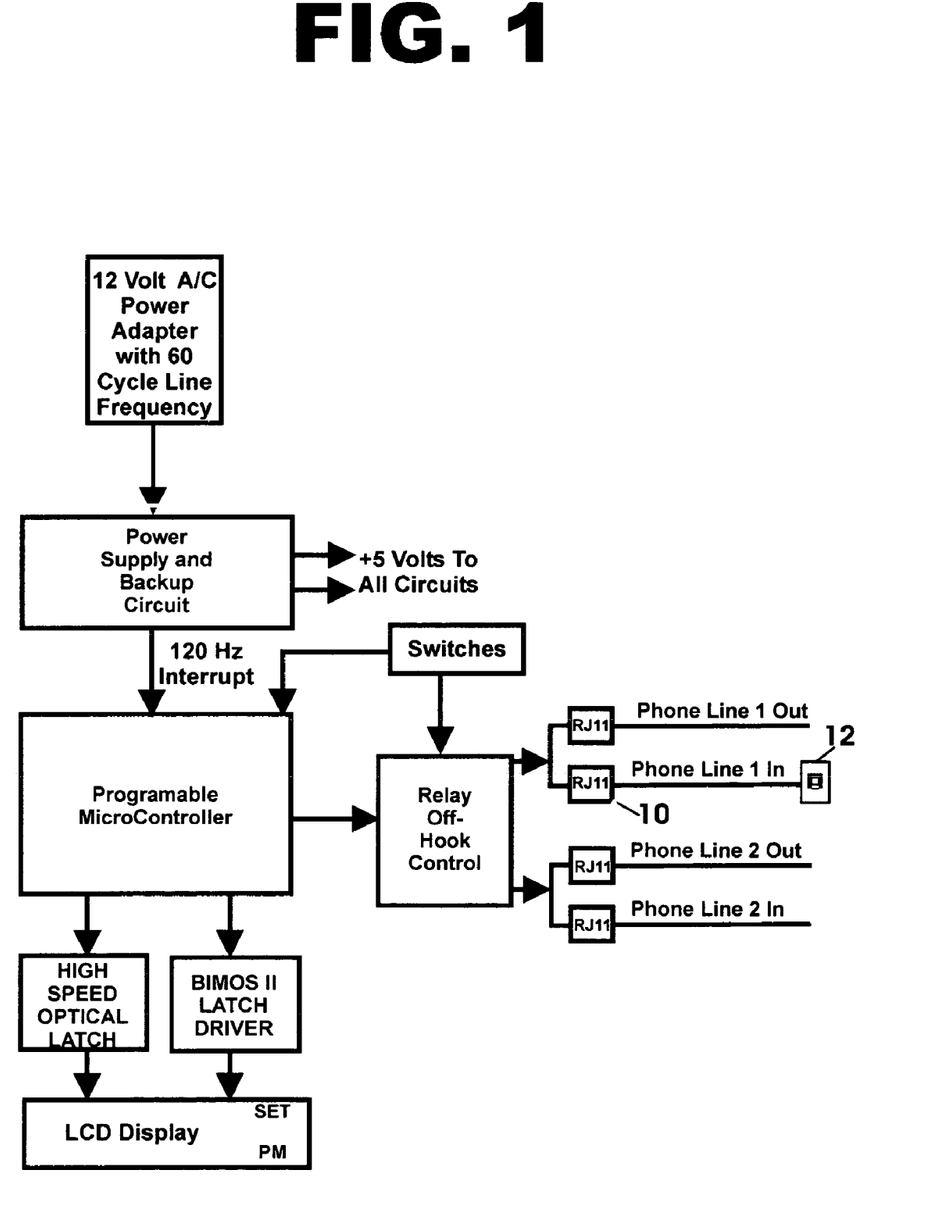
FIG. 1 is a block diagram of a telephone apparatus in accordance with my invention.
Figure 3:
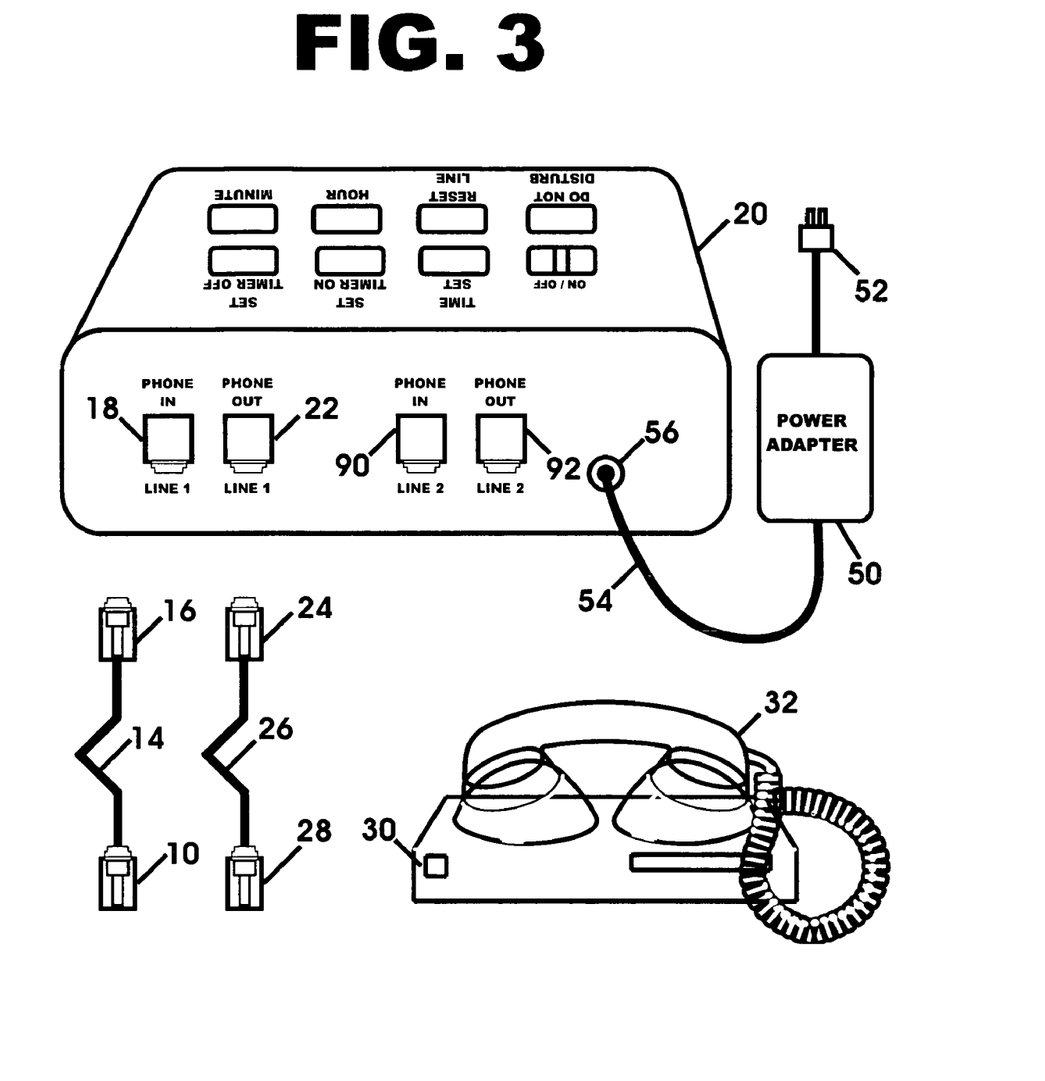
FIG. 3 is a top, rear perspective view of the stand alone console which is shown in FIG. 2, showing additional parts.

Referring to the Figures, FIG. 1 shows at 10 a known RJ11 telephone plug for use in connecting a telephone line 14 (FIG. 3) of the type commonly used in a telephone handset, to the telephone jack 12 provided by a telephone signal provider. The other end of the line 14 also has an RJ11 plug 16 for connection with a jack 18 of the same type as jack 12. Jack 18 is mounted in a console 20 (FIG. 3). Also mounted in the console 20 is jack 22. Telephone line 26 has plugs 24, 28 at each end to connect the console to the telephone receiver 32 (as at jack 30). Calls can be received and placed through the telephone in the usual fashion.

Figures 4A, 4B:
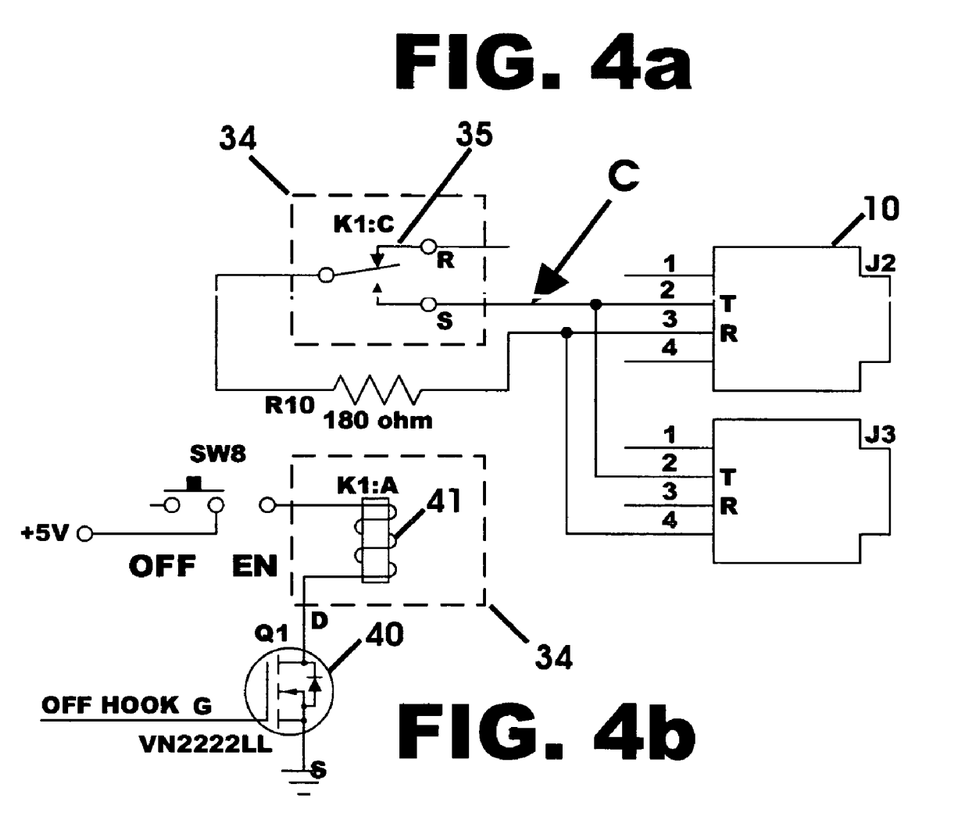
FIGS. 4a and 4b and schematic diagrams of a portion of my apparatus.

Normally an incoming call will cause the telephone to ring. Lines T and R, of plug 10 FIG. 4a provide a part of a circuit designated generally "C" into my apparatus. If these lines are connected (as, for example, when the telephone is "in use"), an incoming call will be met by a busy signal; and the telephone will not ring. In accordance with my invention, I simulate the "in use" condition to, thus, prevent the ringing of the telephone. Furthermore, my device will prevent the ringing of all telephones on the same line: without the need to connect additional devices.

FIGS. 4a and 4b show a relay designated 34 in circuit "C". In its normal condition, the relay switch 35, as shown, is "open"; allowing for normal telephone operation.

Figure 6:
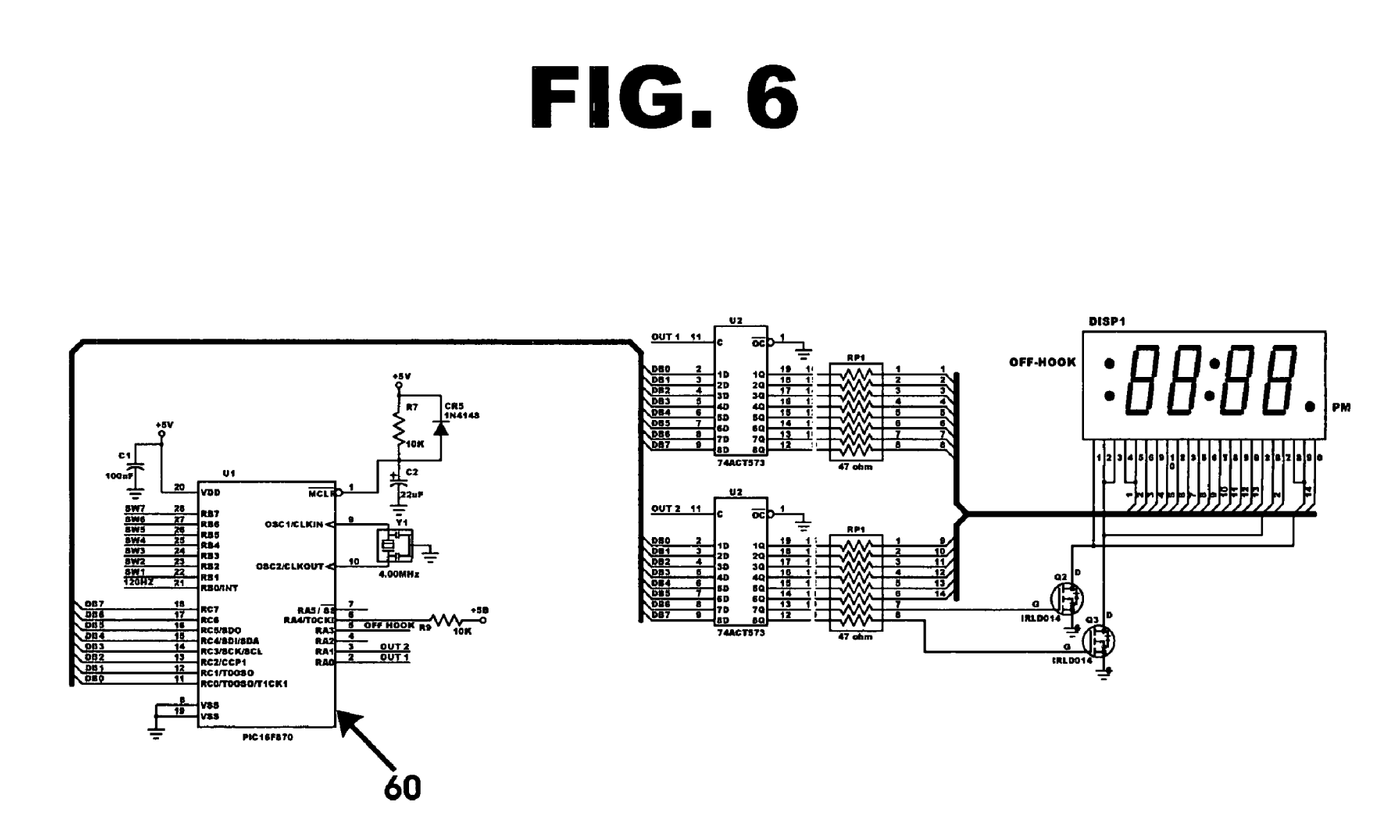
FIG. 6 is a schematic diagram of another portion of my apparatus.

FIG. 4b shows a detail of the relay 34. To close the relay switch 35, I provide a controller means comprising a transistor means and a microcontroller means. An input signal is provided to a small signal mosfet transistor 40 (in the transistor means) from a microcontroller 60, FIG. 6 (in the controller means). The transistor 40 thereupon creates a circuit to allow the coil 41 in the relay to activate and, thereby, close the switch 35 to the plug 10. This closed circuit simulates a busy signal to incoming calls, because of the resistance provided by the 180 ohm resister. As a result, an "in use" mode is simulated in the line and all telephones on that line are prevented from ringing.

Figure 5:
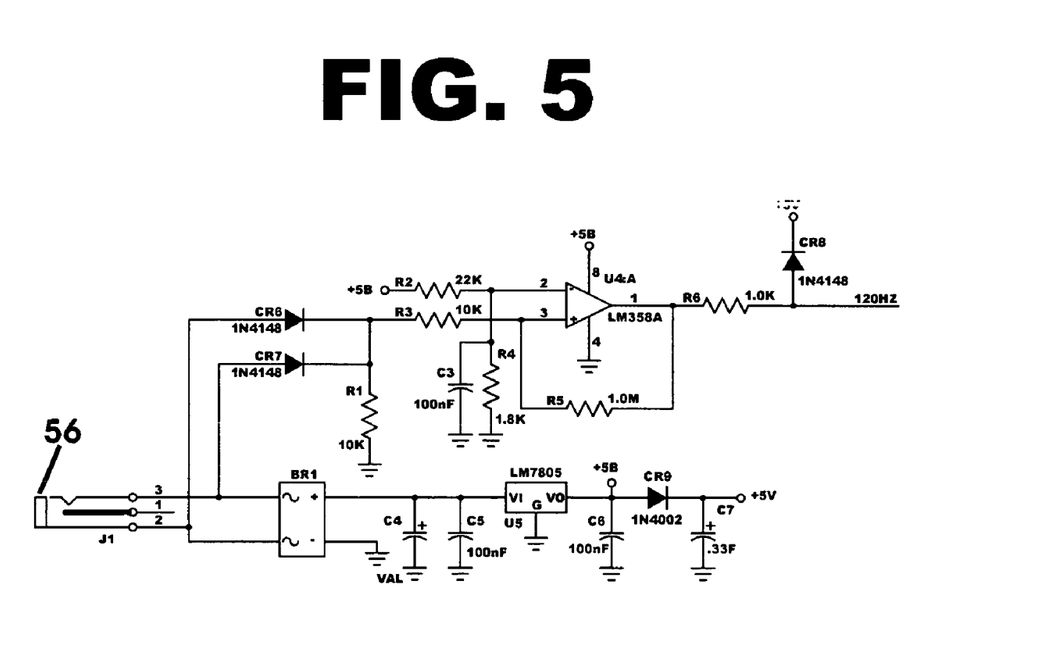
FIG. 5 is a schematic diagram of another portion of my apparatus.

A power adapter/transformer 50, FIG. 3 is provided to be plugged into a standard 120 volt AC, 60 cycle source via plug 52. It provides 5 volt AC current via cord 54 to a power supply connector 56 in the console 20 (FIGS. 3 and 5). This is used to supply 5 volts AC all electrical components. The schematic for the power supply circuit is shown in FIG. 5.

When my timer in the console cuts off the signal to the transistor 40, it no longer functions to complete the circuit to the relay, and the relay returns to its normal condition. This opens the circuit and allows al telephones on the same line to return to their normal operating condition.

The console 20 contains a microcontroller (designated generally 60, FIG. 6) which is a flash micrcontroller, such as, part number PIC16F870 supplied by Microchip Technology, Inc, 2355 West Chandler Boulevard, Chandler, Ariz. 85224-6199. This functions through PORTC of the microchip interfacing with two 74ACT573 high speed octal latches that drive a 0.9 LED clock display allowing for the exhibiting of hours, minutes, PM and Set functions. All timing and control functions are achieved by the programming of the PIC16F870, on board Data EEPROM. However, other manufacturers' products may be used.

Figure 7:
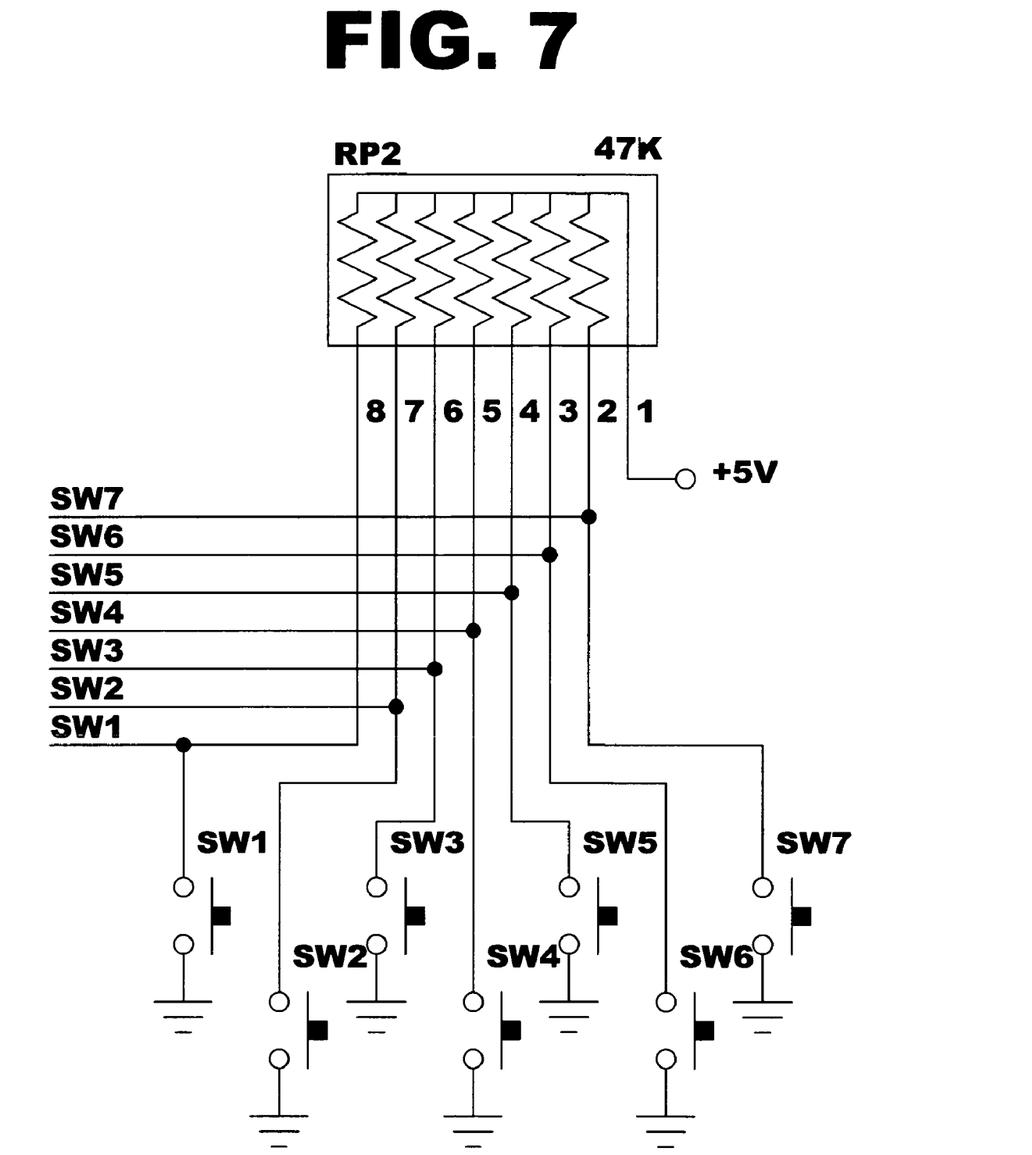
FIG. 7 is a schematic diagram of another portion of my apparatus.

Eight activating switches (shown on top, FIG. 2 ) are provided to control all functions through PIC16F870 PORTB interface. The schematic for seven of these momentary contact switches is shown on FIG. 7. The eight is shown on FIG. 4b.

Figure 2:
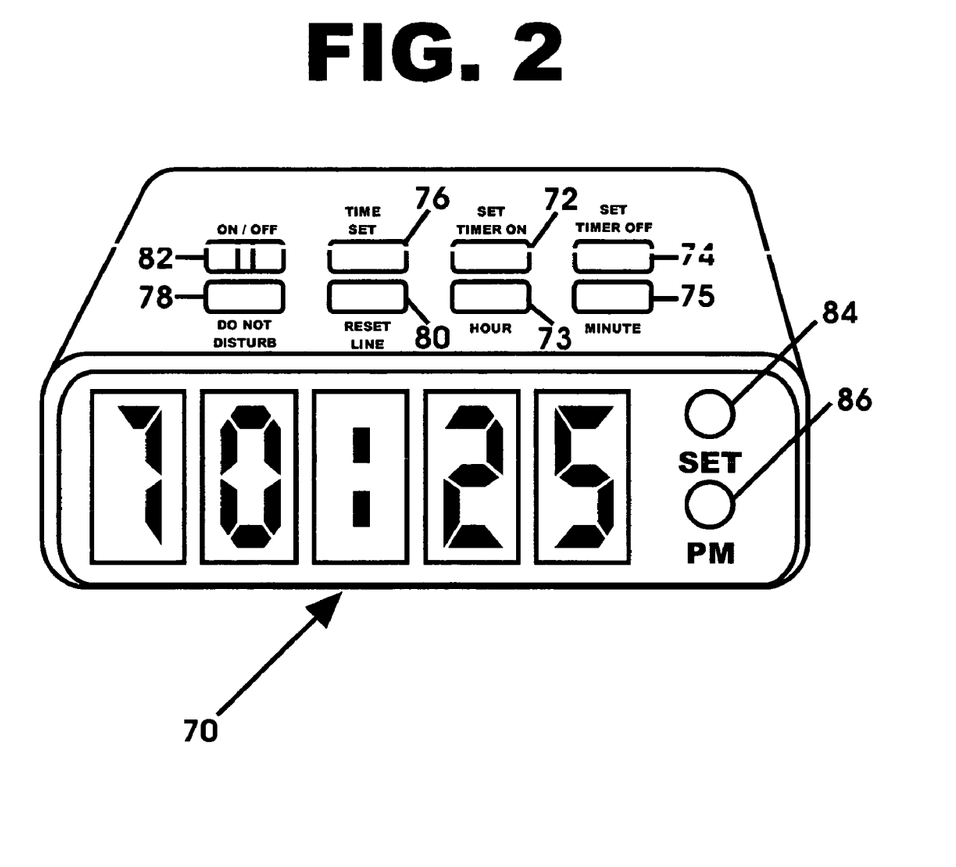
FIG. 2 is a top, front perspective view of a stand alone console which is a part of the apparatus in accordance with my invention.

The clock timing apparatus (designated generally 70, FIG. 2), provides the following functions:

"Set Timer On" (button 72) to control the start of a simulated "in use" condition; in minutes (button 75) and hours (button 73).

"Set Timer Off" (button 74) to control the end of the simulated "in use" condition; in minutes (button 75) and hours (button 73).

Once set, these two times remain as set until they are changed. They are, thus, repeatable from day to day.

"Time Set" (button 76) to set the clock to the time of day in minutes (button 75) and hours (button 73).

"Do Not Disturb" (button 78) to provide a second type of "on" function for the simulated "in use" condition. This is pre-programed for a set interval of time, say, 15 minutes by pressing the "Do Not Disturb" button 78 and the minute button 75. Each time the button 78 and the minute button 75 are pressed, it adds 15 minutes more; for up to a maximum, such as, 60 minutes. This function can also be set for other time intervals, such as, by pressing the "Do Not Disturb" button 78 and the hour button 73. Each time the button 78 and the hour button 73 are pressed, it adds another hour more; for up to a maximum, such as, 6 hours. This is a non-repeatable function, that is, once it runs out it does not repeat the next day. The "Do Not Disturb" function can also be aborted by pressing the "Reset Line" button 80.

"Reset line" (button 80) to release the prior "set" times and brings the telephone back to its normal operating condition. However, the repeatable functions are still in place for the next day.

"On/Off" (switch 82) to control the operation of the relay 34 and prevent the apparatus from functioning to simulate the "in use" mode.

There is also a "Set" light 84 on the front of the consol to indicate when the device has been activated and "PM" light 86 on the front to the console to indicate the time of day.

The method of operation is as follows.

To set the clock's time of day, simultaneously push "Time Set" and "Hour" buttons to select the hour and release the buttons to "Set" the selected hour. Simultaneously push "Time Set" and "Minute" buttons to select the minute and release the buttons to "Set" the selected minute.

To set the repeatable start time to simulate telephone "in use", simultaneously push "Set Timer On" and "Hour" buttons to select the hour and release the buttons to "Set" the selected hour. Simultaneously push "Set Timer On" and "Minute" buttons to select the minute and release the buttons to "Set" the selected minute.

To set the repeatable time to stop the simulated telephone "in use" function, simultaneously push "Set Timer Off" and "Hour" buttons to select the hour and release the buttons to "Set" the selected hour. Simultaneously push "Set Timer Off" and "Minute" buttons to select the minute and release the buttons to "Set" the selected minute. Once the timed cycle is completed, the telephone line is restored to its normal condition; until the next day. On the next day, the on/off cycle repeats.

The ON/OFF switch allows the user to disconnect and reconnect the device to control the operation of the telephone line. When disconnected by this switch, the telephone line operates as usual.

Multiple lines can be controlled at the same time such as one additional line by using additional telephone jacks 90, 92, FIG. 3 and additional telephone lines (not shown).

What is claimed is:

1. In a telephone system having at least one telephone and at least one telephone line, and a circuit connected thereto which provides a busy signal in said telephone line when a telephone is in an "in use" mode, a simulation means connected to said line to simulate said "in use" mode independently of any incoming telephone signal, comprising:
   a. switch means in said circuit, switchable between an open circuit position and a closed circuit position;
   b. relay means connected to said switch means to switch said switch means between said positions;
   c. controller means connected to said relay means to cause said relay means to switch said switch means as aforesaid; and
   d. time set means connected to said controller means to set time intervals that the controller means causes the relay means to switch said switch means as aforesaid independently of any incoming telephone signal wherein the time set means provides the following functions:
      a "Set Timer On" function to repeatedly control the start of the simulated "in use" mode in minutes and hours;
      a "Set Timer Off" function to repeatedly control the end of the simulated "in use" mode in minutes and hours;
      a repeat function whereby once set, the two functions set out in 3.a and 3.b above remain as set until they are changed;
      a clock and a "Time Set" function to set said clock to the time of day in minutes and hours;
      a "Reset line" function for releasing the prior "set" times, whereby the telephone is brought back to its normal operating mode; while, at the same time saving the repeatable functions in place for the next day; and
      an "On/Off" function for controlling the operation of the simulation means.

2. In a telephone system having at least one telephone and at least one telephone line, and a circuit connected thereto which provides a busy signal in said telephone line when a telephone is in an "in use" mode, a simulation means connected to said line to simulate said "in use" mode independently of any incoming telephone signal, comprising:
   a. switch means in said circuit, switchable between an open circuit position and a closed circuit position;
   b. relay means connected to said switch means to switch said switch means between said positions;
   c. controller means connected to said relay means to cause said relay means to switch said switch means as aforesaid;

d. time set means connected to said controller means to set time intervals that the controller means causes the relay means to switch said switch means as aforesaid independently of any incoming telephone signal further comprising a non-repeatable "Do Not Disturb" function providing a second simulated "in use" mode function which can be pre-programed for a second set interval of time, such that each time the "Do Not Disturb" function is invoked, it adds the same second set time interval to the previously set second interval of time.

3. The system of claim 1 further comprising a non-repeatable "Do Not Disturb" function providing a second simulated "in use" mode function which can be pre-programed for a second set interval of time, such that each time the "Do Not Disturb" function is invoked, it adds the same second set time interval to the previously set second interval of time.

4. A method of simulating an "in use" mode independently of any incoming telephone signal in a telephone system having at least one telephone and at least one telephone line, and a circuit which provides a busy signal to said telephone line when a telephone is in an "in use" mode, comprising; providing a switch means in said circuit switchable between an open circuit position and a closed circuit position; providing a relay means connected to said switch means to switch said switch means between said positions; providing a controller means connected to said relay means to cause said relay means to switch said switch means as aforesaid; and providing time set means connected to said controller means to set time intervals that the controller means causes the relay means to switch said switch means as aforesaid independently of any incoming telephone signal and wherein the time set means further provides the following functions:
   a. a "Set Timer On" function to repeatedly control the start of the simulated "in use" mode in minutes and hours;
   b. a "Set Timer Off" function to repeatedly control the end of the simulated "in use" mode in minutes and hours;
   c. a repeat function whereby once set, the two functions set out in 3.a and 3.b above remain as set until they are changed;
   a clock and a "time Set" function to set said clock to the time of day in minutes and hours;
   e. a "Reset line" function for releasing the prior "set" times, whereby the telephone is brought back to its normal operating mode; while, at the same time, saving the repeatable functions in place for the next day; and
   f. an "On/Off" function for controlling the operation of the simulation means.

5. A method of simulating an "in use" mode independently of any incoming telephone signal in a telephone system having at least one telephone and at least one telephone line, and a circuit which provides a busy signal to said telephone line when a telephone is in an "in use" mode, comprising: providing a switch means in said circuit, switchable between an open circuit position and a closed circuit position; providing a relay means connected to said switch means to switch said switch means between said position: providing controller means connected to said relay means to cause said relay means to switch said switch means as aforesaid; and providing time set means connected to said controller means to set time intervals that the controller means causes the relay means to switch said switch means as aforesaid independently of any incoming telephone signal and further comprising providing a non-repeatable "Do Not Disturb" function providing a second simulated "in use" mode function which can be pre-programed for a second set interval of time, such that each time the "Do Not Disturb" function is invoked, it adds the same second set time interval to the previously set second interval of time.

6. The method of claim 4 further comprising providing a non-repeatable "Do Not Disturb" function providing a second simulated "in use" mode function which can be pre-programed for a second set interval of time, such that each time the "Do Not Disturb" function is invoked, it adds the same second set time interval to the previously set second interval of time.

7. In a telephone system having at least one telephone and at least one telephone line, and a circuit connected thereto which provides a busy signal in said telephone line when a telephone is in an "in use" mode, a simulation means connected to said line to simulate said "in use" mode, comprising:
   a. switch means in said circuit, switchable between an open circuit position and a closed circuit position;
   b. relay means connected to said switch means to switch said switch means between said positions;
   c. controller means connected to said relay means to cause said relay means to switch said switch means as aforesaid; and
   d. time set means connected to said controller means to set time intervals that the controller means causes the relay means to switch said switch means as aforesaid wherein the time set means provides the following functions:
      I. a "Set Timer On" function to repeatedly control the start of the simulated "in use" mode in minutes and hours;
      ii. a "Set Timer Off" function to repeatedly control the end of the simulated "in use" mode in minutes and hours;
      iii. a repeat function whereby once set, the two functions set out in 3.a and 3.b above remain as set until they are changed;
      iv. a clock and a "Time Set" function to set said clock to the time of day in minutes and hours;
      a "Reset line" function for releasing the prior "set" times, whereby the telephone is brought back to its normal operating mode; while, at the same time, saving the repeatable functions in place for the next day; and
      vi. an "On/Off" function for controlling the operation of the simulation means.

8. The system of claim 7 further comprising a non-repeatable "Do Not Disturb" function providing a second simulated "in use" mode function which can be pre-programed for a second set interval of time, such that each time the "Do Not Disturb" function is invoked, it adds the same second set time interval to the previously set second interval of time.

9. In a telephone system having at least one telephone and at least one telephone line, and a circuit connected thereto which provides a busy signal in said telephone line when a telephone is in an "in use" mode, a simulation means connected to said line to simulate said "in use" mode, comprising:
   a. switch means in said circuit, switchable between an open circuit position and a closed circuit position;
   b. relay means connected to said switch means to switch said switch means between said positions;
   c. controller means connected to said relay means to cause said relay means to switch said switch means as aforesaid;
   d. time set means connected to said controller means to set time intervals that the controller means causes the relay means to switch said switch means as aforesaid; and
   e. a non-repeatable "Do Not Disturb" function providing a second simulated "in use" mode function which can be pre-programed for a second set interval of time, such that each time the "Do Not Disturb" function is invoked, it adds the same second set time interval to the previously set second interval of time.

10. A method of simulating an "in use" mode in a telephone system having at least one telephone and at least one telephone line, and a circuit which provides a busy signal to said telephone line when a telephone is in an "in use" mode, comprising: providing a switch means in said circuit, switchable between an open circuit position and a closed circuit position; providing a relay means connected to said switch means to switch said switch means between said positions; providing a controller means connected to said relay means to cause said relay means to switch said switch means as aforesaid; and providing time set means connected to said controller means to set time intervals that the controller means causes the relay means to switch said switch means as aforesaid, wherein the time set means further provides the following functions:

a. a "Set Timer On" function to repeatedly control the start of the simulated "in use" mode in minutes and hours;

b. a "Set Timer Off" function to repeatedly control the end of the simulated "in use" mode in minutes and hours;

c. a repeat function whereby once set, the two functions set out in 3.a and 3.b above remain as set until they are changed;

d. a clock and a "Time Set" function to set said clock to the time of day in minutes and hours;

e. a "Reset line" function for releasing the prior "set" times, whereby the telephone is brought back to its normal operating mode; while, at the same time, saving the repeatable functions in place for the next day; and f. an "On/Off" function for controlling the operation of the simulation means.

11. The method of claim 10 further comprising providing a non-repeatable "Do Not Disturb" function providing a second simulated "in use" mode function which canto pre-programed for a second set interval of time, such that each time the "Do Not Disturb" function is invoked, it adds the same second set time interval to the previously set second interval of time.

* * * * *